United States Patent
Chou et al.

(10) Patent No.: US 7,729,214 B1
(45) Date of Patent: Jun. 1, 2010

(54) METHOD AND APPARATUS APPLIED IN OPTICAL DISC DRIVE FOR OBTAINING PUSH-PULL SIGNAL VIA ADJUSTING AMPLIFYING GAIN ACCORDING TO FLUCTUATING SIGNALS GENERATED FROM PHOTO DETECTOR OF PICK-UP HEAD

(75) Inventors: Chia-Hua Chou, Taipei Hsien (TW); Chin-Yuan Hu, Chia-I (TW); Ming-Jiou Yu, Taipei (TW)

(73) Assignee: MediaTek Inc., Hsin-Chu Hsien (TW)

( * ) Notice: Subject to any disclaimer, the term of this patent is extended or adjusted under 35 U.S.C. 154(b) by 755 days.

(21) Appl. No.: 11/161,586

(22) Filed: Aug. 9, 2005

(51) Int. Cl.
G11B 7/00 (2006.01)
(52) U.S. Cl. ............... 369/44.29; 369/53.45; 369/44.35
(58) Field of Classification Search ......... None
See application file for complete search history.

(56) References Cited

U.S. PATENT DOCUMENTS

| | | | |
|---|---|---|---|
| 5,652,743 A * | 7/1997 | Takamine et al. ........ | 369/44.32 |
| 6,754,157 B2 * | 6/2004 | Osada .................... | 369/53.28 |
| 6,785,207 B2 | 8/2004 | Nishimura et al. | |
| 7,061,845 B2 * | 6/2006 | Maegawa ................ | 369/53.34 |
| 7,197,001 B2 * | 3/2007 | Hsu ....................... | 369/59.27 |
| 2003/0128641 A1 * | 7/2003 | Maegawa et al. ........ | 369/47.45 |
| 2004/0196767 A1 * | 10/2004 | Sameshima ............. | 369/53.28 |
| 2005/0117503 A1 * | 6/2005 | Yanagawa et al. ...... | 369/124.12 |
| 2005/0147016 A1 * | 7/2005 | Morikawa et al. ....... | 369/124.1 |

FOREIGN PATENT DOCUMENTS

WO  WO 03075264 A  *  9/2003

* cited by examiner

*Primary Examiner*—Lixi Chow
(74) *Attorney, Agent, or Firm*—Winston Hsu

(57) ABSTRACT

An apparatus for obtaining a push-pull signal is disclosed. The apparatus includes: a first amplifier coupled to a first fluctuating signal for utilizing a first gain value to amplify the first fluctuating signal and then outputting a first amplified fluctuating signal; a second amplifier coupled to a second fluctuating signal for utilizing a second gain value to amplify the second fluctuating signal and then outputting a second amplified fluctuating signal; a subtractor electrically connected to the first and second amplifiers for subtracting the second amplified fluctuating signal from the first amplified fluctuating signal to generate the push-pull signal; and a level decision unit electrically connected to the first and second amplifiers for controlling the amplitudes of signals amplified by the first and second amplifiers when the optical disc drive is switched from a first operating mode to a second operating mode.

14 Claims, 7 Drawing Sheets

METHOD AND APPARATUS APPLIED IN OPTICAL DISC DRIVE FOR OBTAINING PUSH-PULL SIGNAL VIA ADJUSTING AMPLIFYING GAIN ACCORDING TO FLUCTUATING SIGNALS GENERATED FROM PHOTO DETECTOR OF PICK-UP HEAD

BACKGROUND

The present invention relates to a method and apparatus applied in an optical disc drive for obtaining a push-pull signal, and more particularly, to a method and apparatus applied in an optical disc drive for obtaining a push-pull signal via adjusting amplifying gains according to fluctuating signals generated from a photo detector of a pick-up head.

As well known to those skilled in the art, an optical disc drive reads information recorded on a wobble track spirally formed on an optical disc to identify physical addresses used for accessing the optical disc or to extract a reference clock (i.e., the wobble clock) used for generating clock signals required by the optical disc drive. The wobble track defines a wavy wobble groove on the optical disc. Therefore, when the pick-up head moves along the track, the pick-up head outputs a laser beam onto the optical disc and then detects intensity of the laser beam reflected from the optical disc. Through comparing intensity of the reflected laser beam detected by two separate sides of a photo detector of the pick-up head, a signal commonly known as a "push-pull signal" is obtained. The push-pull signal is a periodic sinusoidal signal whose period is related to the position of the pick-up head and the rotating speed of the optical disc, so it is suitable to be referenced by the optical disc drive. In short, it is very important to extract an accurate, undistorted push-pull signal so as to achieve high stability and good performance.

As mentioned above, the push-pull signal is applied to identify physical addresses on the optical disc. Taking a DVD-R/RW disc for example, there are some land pre-pits pre-recorded on the wobble track, resulting in spike patterns included in the generated push-pull signal. Please refer to FIG. 1 in conjunction with FIG. 2. FIG. 1 is a diagram of a pick-up head 10 moving on an optical disc 50 according to the related art. FIG. 2 is a diagram of a push-pull signal $S_1$ generated according to signals detected by a photo detector 12 of the pick-up head 10 shown in FIG. 1. As shown in FIG. 1, a small area on an optical disc 50 is enlarged, showing a plurality of wobble track segments 30a, 30b and a plurality of data track segments 32a, 32b. These wobble track segments 30a, 30b belong to a single wobble track spirally formed on the optical disc 50, and these data track segments 32a, 32b belong to a single data track spirally formed on the optical disc 50. The wobble track segments 30a and 30b are land regions, while data track segments 32a and 32b are groove regions. In addition, as shown in FIG. 1, there are a plurality of data patterns 34 recorded on the data track segments 32a and 32b.

On the optical disk 50, due to intensity of the reflected laser beam in the land region being different from the groove region, the four areas A, B, C, and D of a photo detector 12 of the pick-up head 10 detect different intensity of the reflected laser beam when the pick-up head 10 moves along wobble track segment 32a according to the direction T. Generally, the intensity of the laser beam detected by areas B and C is subtracted from the intensity of the laser beam detected by areas A and D to generate a push-pull signal $S_1$. Please note that a land pre-pit 20 disrupts wobble track segment 30b as shown in FIG. 1, and when the pick-up head 10 moves across the land pre-pit 20, the corresponding push-pull signal $S_1$ shown in FIG. 2 has a spike due to asymmetry between two sides of the wobble track segments 30a, 30b. Therefore, if a spike is detected, the optical disc drive knows that a land pre-pit 20 is located at the current position of the pick-up head 10. User data are recorded onto the optical disc 50 according to the corresponding address, and the land pre-pits materialize the addressing on the optical disc 50. Therefore, how to obtain a correct push-pull signal $S_1$ with an easy-detecting spike relates to performance of the optical disc drive.

Please refer to FIG. 3. FIG. 3 is a diagram of a conventional apparatus for generating a push-pull signal $S_1$. The pick-up head 10 detects a reflected laser beam from an optical disc by a photo detector 12, and four areas A, B, C, and D of a photo detector 12 output four detecting signals $I_A$, $I_B$, $I_C$, and $I_D$, respectively. Next, these detecting signals $I_A$, $I_B$, $I_C$, and $I_D$ pass through pre-amplifiers 100a-100d respectively, becoming amplified detecting signals $I_A'$, $I_B'$, $I_C'$, and $I_D'$. Then, the amplified detecting signals $I_A'$, $I_B'$, $I_C'$, and $I_D'$ are respectively transferred into following gain adjusters 110a-110d. The purpose of the gain adjusters 110a-110d is for further enlarging amplitudes of the amplified detecting signals $I_A'$, $I_B'$, $I_C'$, and $I_D'$ to obtain an easily distinguished push-pull signal $S_1$. Amplified signals $I_B''$ and $I_C''$ are summed up through an adder 130a and then transferred into a balance adjuster 120a for eliminating asymmetry, and amplified signals $I_A''$ and $I_D''$ are summed up through an adder 130b and then transferred into a balance adjuster 120b. Finally, a subtractor 140 subtracts these two balanced signals outputted from the balance adjusters 120a and 120b to generate the wanted push-pull signal $S_1$. As described above, one of the key methods of getting the push-pull signal $S_1$ is gain adjusting performed by the gain adjusters 110a-110d to maximize the amplitudes of detecting signals $I_A$-$I_D$.

In the normal operations of optical disc drives, there are three basic modes—read mode, write mode, and blank mode. When the optical disc drive is reading data from or writing data into the optical disc, the pick-up head 10 detects a reflected laser beam containing data information and wobble information such that the detecting signals $I_A$-$I_D$ are mixed with pulse signals. Unfortunately, the amplitude of the pulse signals (i.e. write pulses in write mode or pulses caused by EFM signal recorded in the groove in read mode) is much larger than the amplitude of wobble signal; therefore each gain adjuster 110a, 110b, 110c, 110d determines the voltage gain mostly according to the amplitude of pulse signals, resulting in a small voltage gain applied to the incoming wobble signal. When the optical disc drive is in the blank mode, there is no pulse signal to interfere with the wobble signal, but because the gain of each gain adjuster 110a, 110b, 110c, 110d is fixed according to the amplitude of pulse signals in read or write mode, the optical disc drive is sure to have bad performance owing to the small gain.

SUMMARY

It is therefore one of the objectives of the claimed invention to provide a method and apparatus applied in an optical disc drive for obtaining a push-pull signal via adjusting an amplifying gain according to fluctuating signals generated from a photo detector of a pick-up head, to solve the above-mentioned problem.

According to the claimed invention, an apparatus in an optical disc drive for obtaining a push-pull signal according to a first fluctuating signal and a second fluctuating signal is disclosed. The apparatus comprises: a first amplifier coupled to the first fluctuating signal for utilizing a first gain value to amplify the first fluctuating signal and then outputting a first amplified fluctuating signal; a second amplifier coupled to the second fluctuating signal for utilizing a second gain value to amplify the second fluctuating signal and then outputting a second amplified fluctuating signal; a subtractor electrically connected to the first and second amplifiers for subtracting the second amplified fluctuating signal from the first amplified fluctuating signal to generate the push-pull signal; and a level decision unit electrically connected to the first and second amplifiers for adjusting the first and second gain values when the optical disc drive is switched from a first operating mode to a second operating mode.

According to the claimed invention, a method applied in an optical disc drive for obtaining a push-pull signal according to a first fluctuating signal and a second fluctuating signal is disclosed. The method comprises: utilizing a first gain value to amplify the first fluctuating signal for generating a first amplified fluctuating signal; utilizing a second gain value to amplify the second fluctuating signal for generating a second amplified fluctuating signal; subtracting the second amplified fluctuating signal from the first amplified fluctuating signal to generate the push-pull signal; and adjusting the first and second gain values when the optical disc drive is switched from a first operating mode to a second operating mode.

The claimed invention provides a method and an apparatus applied in an optical disc drive for obtaining a push-pull signal via adjusting amplifying gains of the amplifiers dynamically. Because the gain values are adjusted according to an operating mode currently activated by the optical disc drive, a precise push-pull signal can be effectively obtained when the operating mode of the optical disc drive is switched from one mode to another mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
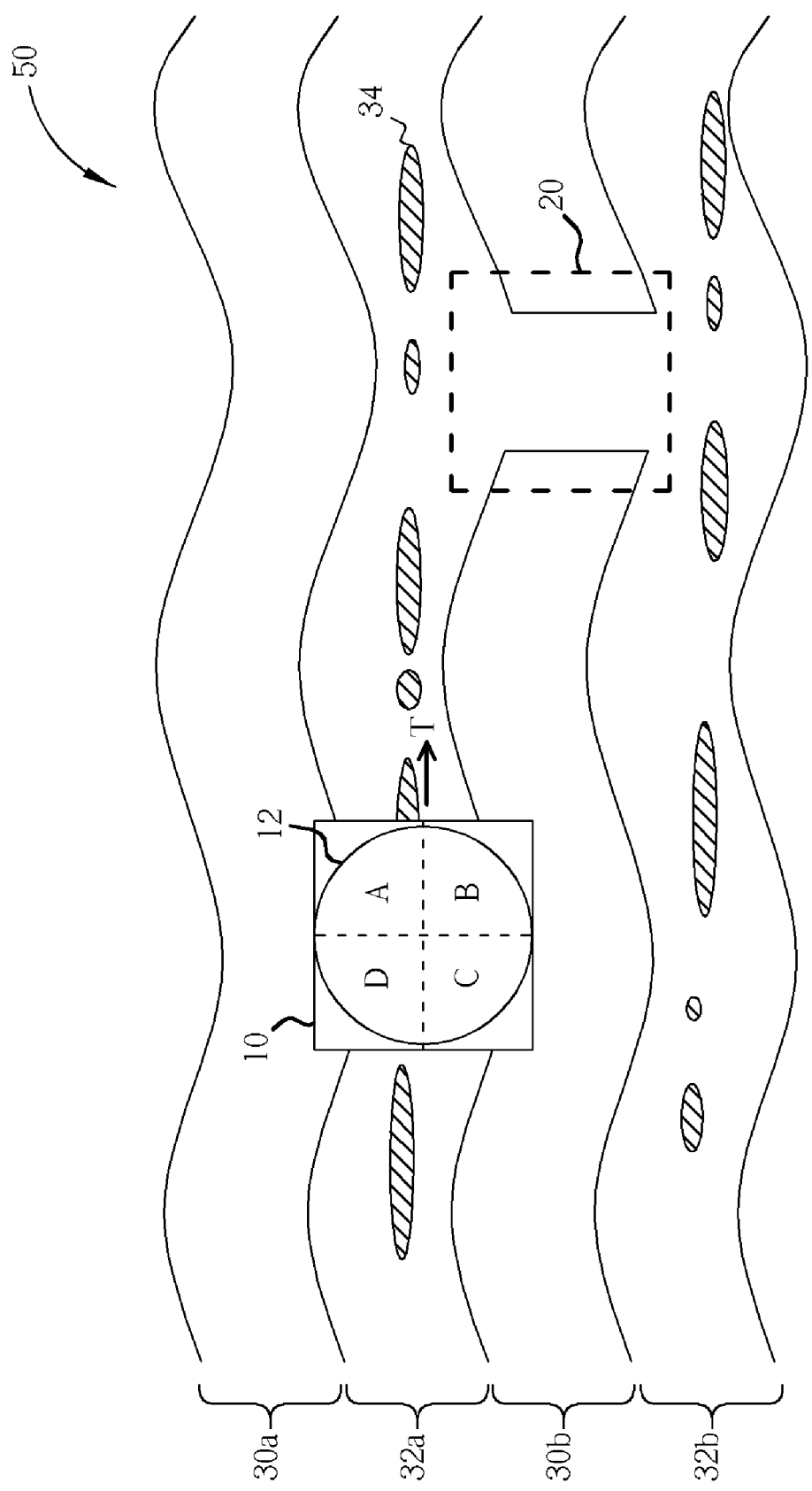
FIG. 1 is a diagram of a pick-up head moving on an optical disc according to the related art.
Figure 2:
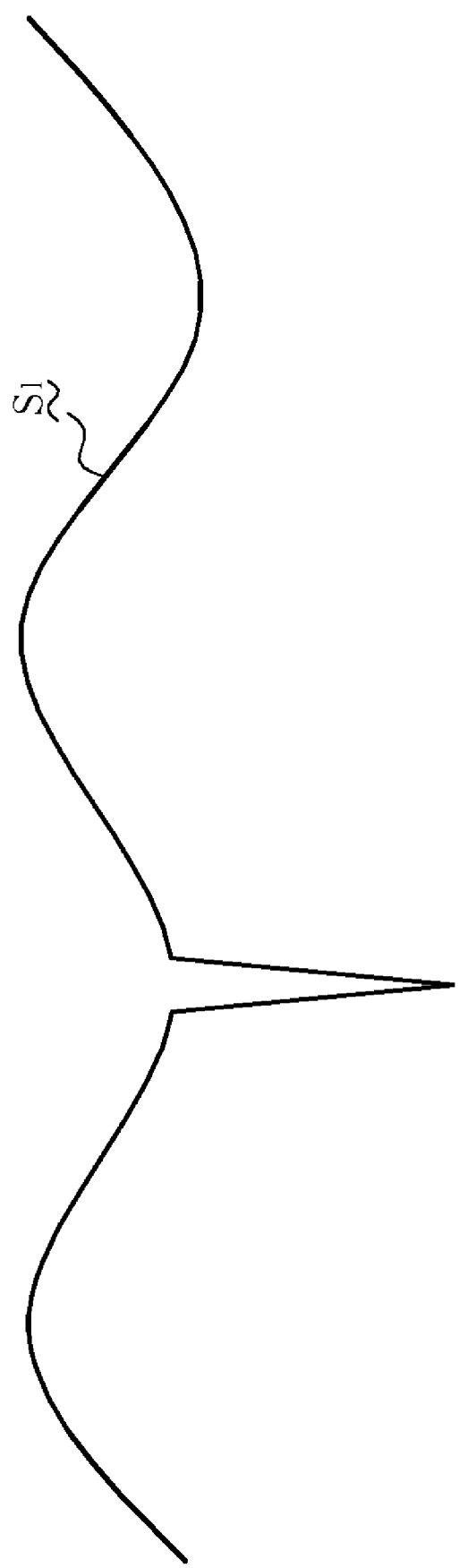
FIG. 2 is a diagram of a push-pull signal generated according to signals detected by a photo sensor of the pick-up head shown in FIG. 1.
Figure 3:
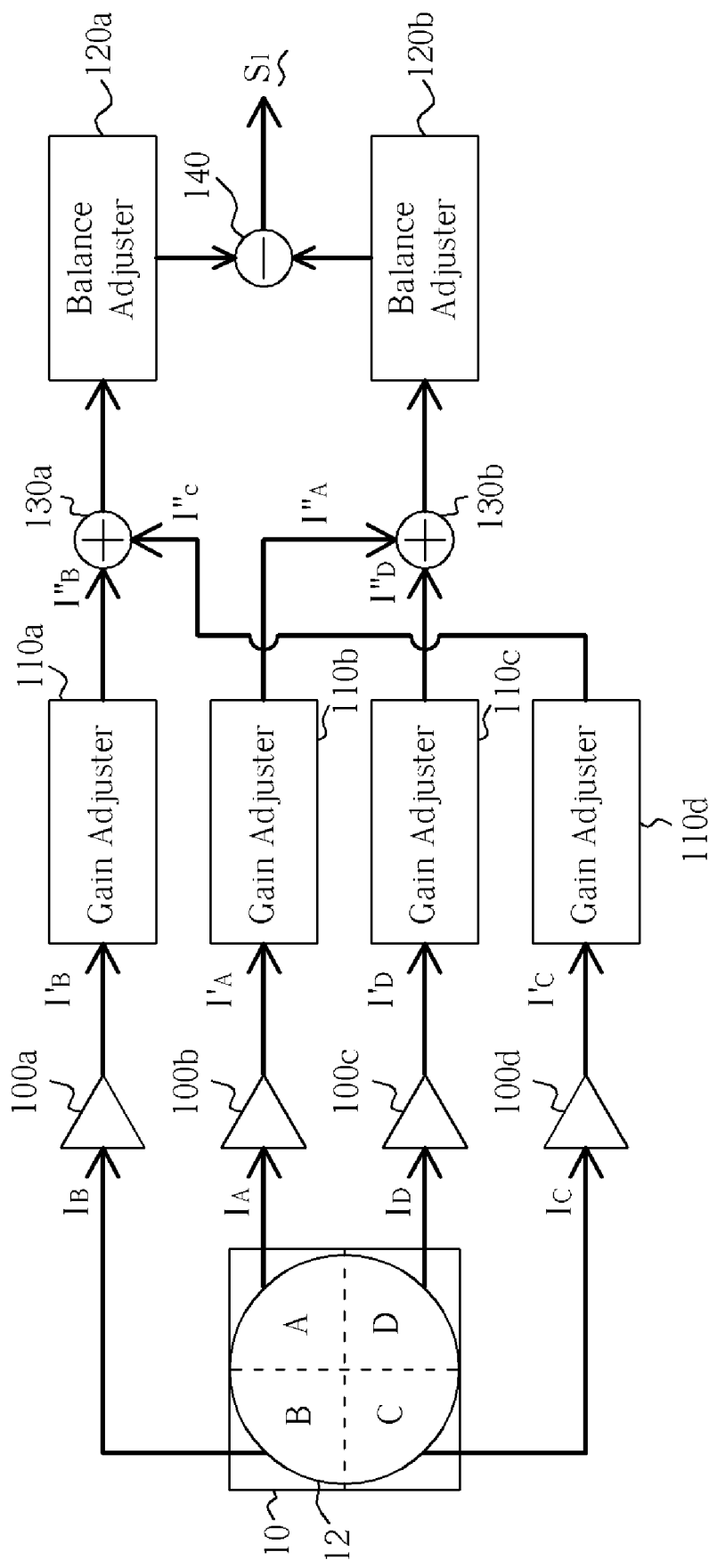
FIG. 3 is a diagram of a conventional apparatus for generating a push-pull signal.
Figure 4:
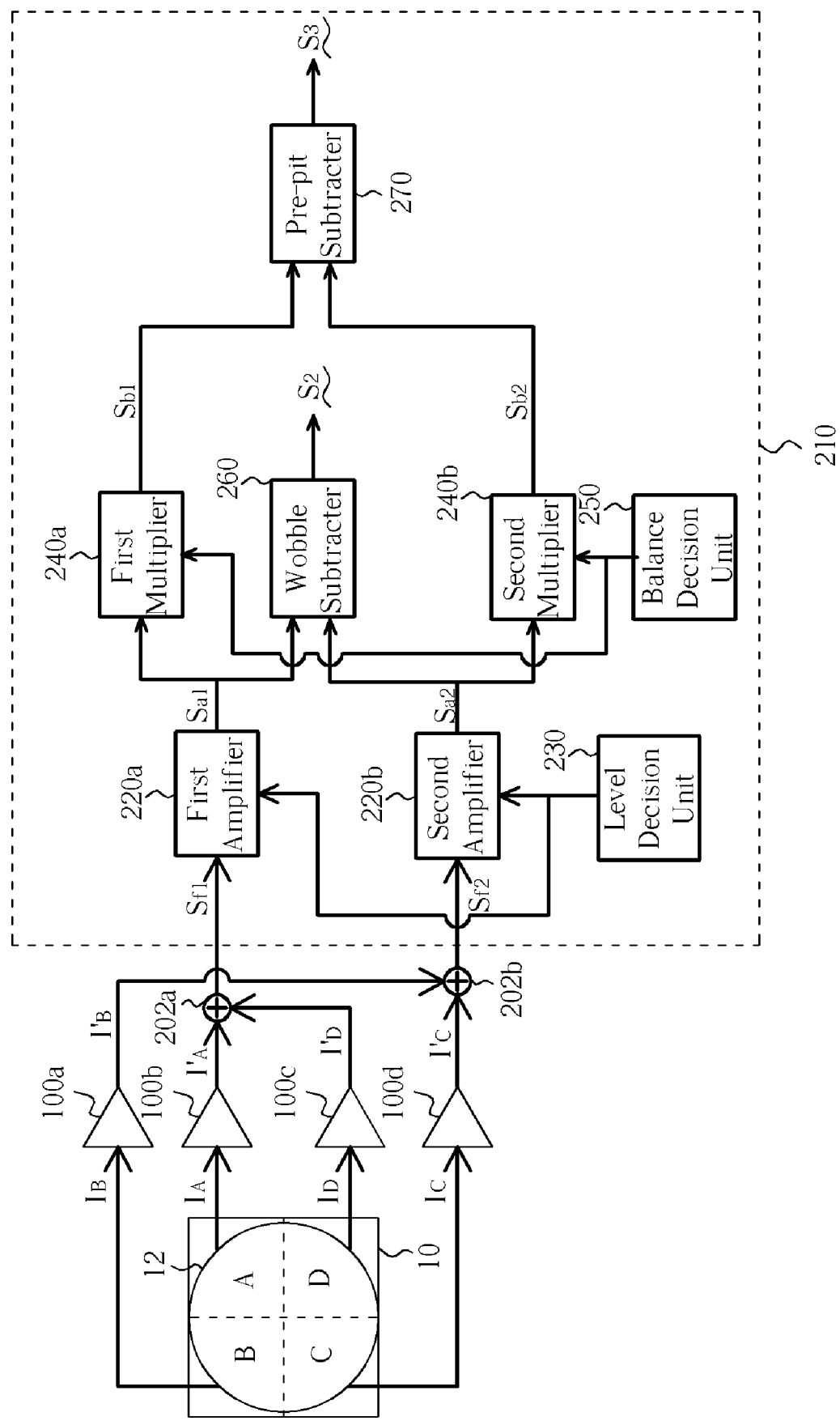
FIG. 4 is a block diagram of an apparatus in an optical disc drive according to a preferred embodiment of the present invention.

Please refer to FIG. 4. FIG. 4 is a block diagram of an apparatus 210 in an optical disc drive (e.g. a DVD-R/RW drive) for obtaining a push-pull signal according to a preferred embodiment of the present invention. The apparatus 210 described in the embodiment includes a first amplifier 220a, a second amplifier 220b, a level decision unit 230, a wobble subtractor 260, a first multiplier 240a, a second multiplier 240b, a balance decision unit 250, and a pre-pit subtractor 270. In addition, there is a pick-up head 10 including a photo detector 12 for detecting the reflected laser beam. As described above, the photo detector 12 is divided into four equal-sized areas A, B, C, and D, where areas A and D move along one side of a wobble track, while areas B and C move along the other side of the wobble track. Pre-amplifiers 100a-100d receive detecting signals $I_A$-$I_D$ from the pick-up head 10. Then, amplified detecting signals $I_A'$ and $I_D'$ are summed up through an adder 202a to form a first fluctuating signal $S_{f1}$ and amplified detecting signals $I_B$ and $I_C$ are summed up through an adder 202b to form a second fluctuating signal $S_{f2}$. The first fluctuating signal $S_{f1}$ is transmitted into a first amplifier 220a (e.g. an auto-gain-control (AGC) amplifier). The first amplifier 220a amplifies the first fluctuating signal $S_{f1}$ and outputs a first amplified fluctuating signal $S_{a1}$ whose amplitude is determined by the level decision unit 230 into the first multiplier 240a and the wobble subtractor 260. In the following, the first multiplier 240a multiplies the first amplified fluctuating signal $S_{a1}$ by a first coefficient that is determined by the balance decision unit 250, and then outputs a first balance-adjusted signal $S_{b1}$ into the pre-pit subtractor 270. The above signal processing is similarly applied to the second fluctuating signal $S_{f2}$. That is, the second fluctuating signal $S_{f2}$ is transmitted into a second amplifier 220b (e.g. an auto-gain-control (AGC) amplifier). The second amplifier 220b amplifies the second fluctuating signal $S_{f2}$ and outputs a second amplified fluctuating signal $S_{a2}$ whose amplitude is determined by the level decision unit 230 into the second multiplier 240b and the wobble subtractor 260. Then, the second multiplier 240b multiplies the second amplified fluctuating signal $S_{a2}$ by a second coefficient that is determined by the balance decision unit 250, and outputs a second balance-adjusted signal $S_{b2}$ into the pre-pit subtractor 270. The wobble subtractor 260 subtracts the second fluctuating signal $S_{f2}$ from the first fluctuating signal $S_{f1}$ to generate a push-pull signal $S_2$, which is commonly called the wobble signal, and the pre-pit subtractor 270 subtracts the second balance-adjusted signal $S_{b2}$ from the first balance-adjusted signal $S_{b1}$ to generate a push-pull signal $S_3$, which is to be further processed by a pre-pit signal detection through utilizing a slicer.

In this embodiment, the level decision unit 230 controls the amplitudes of amplified fluctuating signals outputted by the first amplifier 220a and the second amplifier 220b according to an operating mode that the optical disc drive is currently running. As mentioned above, when the optical disc drive is in a read or a write mode the wobble signal is mixed with pulse signals, and the level decision unit 230 controls the amplitudes of the amplify fluctuating signals $S_{f1}$ and $S_{f2}$. This is different from the related art in that when the optical disc drive is switched from the read or write mode to the blank mode, the level decision unit 230 immediately makes the amplitudes of $S_{a1}$ and $S_{a2}$ smaller than those used in read or write mode. Therefore, the wobble subtractor 260 receives amplified fluctuating signals $S_{a1}$ and $S_{a2}$ with large amplitude, and generates a more accurate push-pull signal $S_2$. Behaviors of the first multiplier 240a, the second multiplier 240b, the balance decision unit 250, and the pre-pit subtractor 270 are respectively similar to the first amplifier 220a, the second amplifier 240b, the level decision unit 230, and the wobble subtractor 260, except that the balance decision unit 250 adjusts the first and second coefficients further considering asymmetric effects of amplified fluctuating signals $S_{a1}$ and $S_{a2}$ caused by the tilt angle, lens shift amount, and pre-pit decoding error rate, etc. That is to say, due to the preceding first and second multipliers 240a, 240b, the pre-pit subtractor 270 is allowed to subtract the second balance-adjusted signal $S_{b2}$ from the first balance-adjusted signal $S_{b1}$ to generate a push-pull signal $S_3$ without performing any voltage level shifting, and the push-pull signal $S_3$ is known as a land pre-pit signal. Please note that, the first amplifier 220a amplifies the first amplified fluctuating signals $S_{a1}$ by a first gain value and the second amplifier 220b amplifies the second amplified fluctuating signals $S_{a2}$ by a second gain value. It is unnecessary for the first gain value to be the same as the second gain value. In other words, the first and second gain values can be determined individually to make the push-pull signal $S_2$ more accurate. By the same reason, the first and second coefficients are determined flexibly according to the design requirements of the push-pull signal $S_3$.

Figure 5:
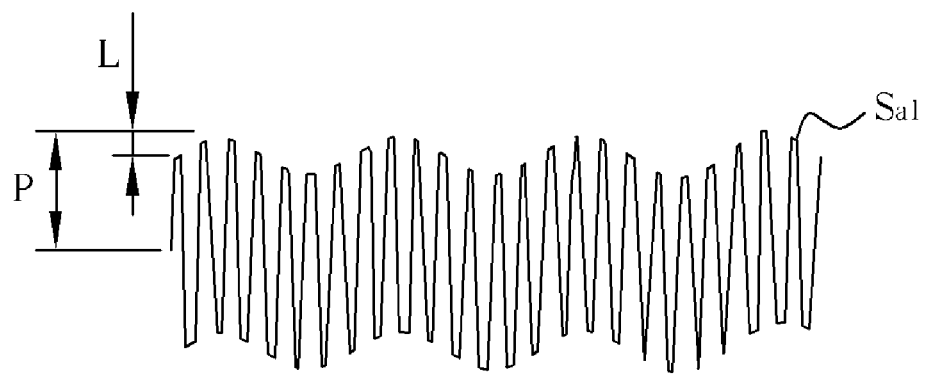
FIG. 5 is a diagram of amplified fluctuating signals read by a wobble subtractor shown in FIG. 4 when a read mode is activated.
Figure 5:
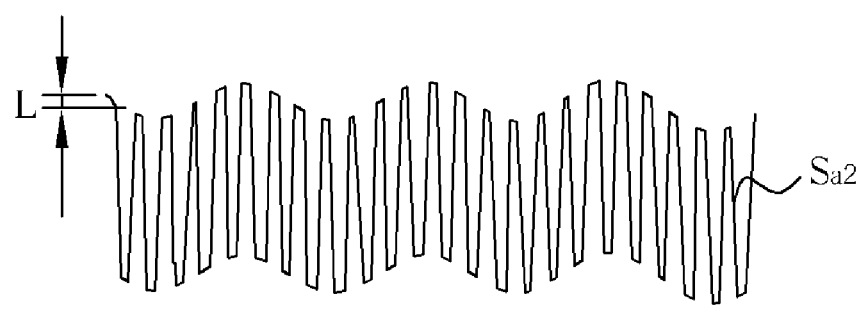
Figure 5:
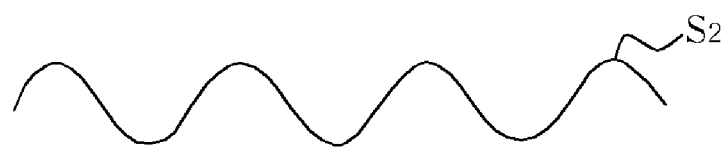
Figure 6:
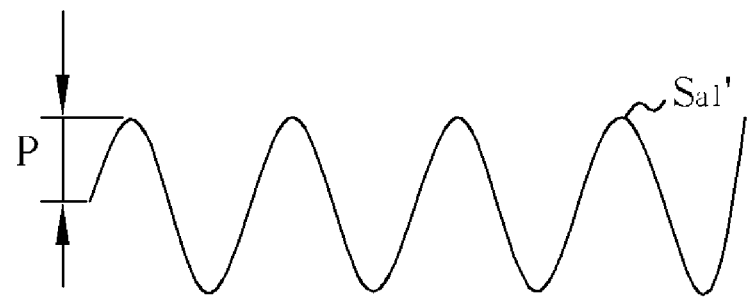
FIG. 6 is a diagram of amplified fluctuating signals read by a wobble subtractor shown in FIG. 4 when a blank mode is activated and the level decision unit stops to control the first and second amplifiers.
Figure 6:
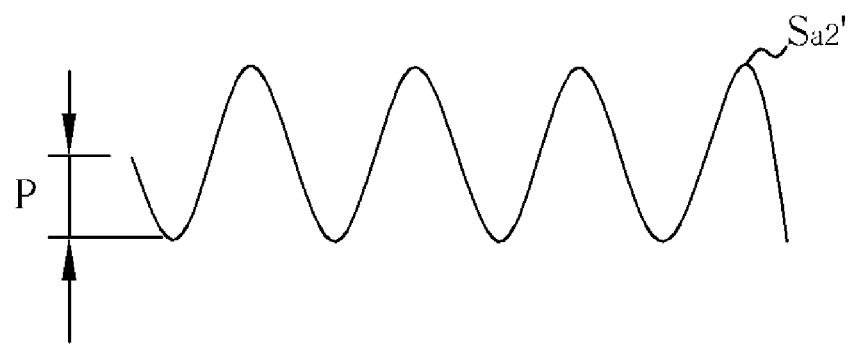
Figure 6:
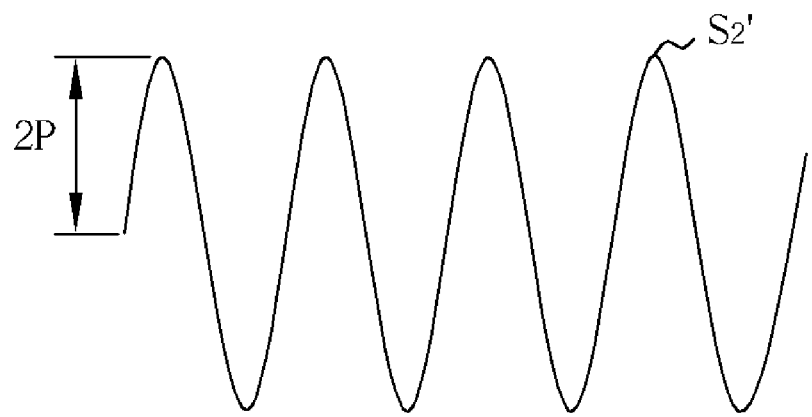
Figure 7:
FIG. 7 is a diagram of amplified fluctuating signals read by a wobble subtractor shown in FIG. 4 when a blank mode is activated and the level decision unit controls the first and second amplifiers.
Figure 7:
Figure 7:

For better explaining the difference between mode switching, for example when the operating mode is switched between read and blank modes, please refer to FIG. 5 and FIG. 6. FIG. 5 is a diagram of amplified fluctuating signals $S_{a1}$ and $S_{a2}$ read by the wobble subtractor 260 shown in FIG. 4 when a read mode is activated, and FIG. 6 is a diagram of amplified fluctuating signals $S_{a1}'$ and $S_{a2}'$ read by the wobble subtractor 260 shown in FIG. 4 when a blank mode is activated and the level decision unit 230 stops to control the first amplifier 220a and the second amplifier 220b, i.e. the skill used in the related art. In the read mode, the fluctuating signals $S_{f1}$ and $S_{f2}$ are carried with a high frequency signal, for example, the well-known RF signals. As FIG. 5 shows, the amplitude of amplified fluctuating signals $S_{a1}$ and $S_{a2}$ are P, but the amplitude of the envelop of amplified fluctuating signals $S_{a1}$ and $S_{a2}$ are L. Therefore the amplitude of the push-pull signal $S_2$ equals to 2L. When the operating mode is switched from the read mode to the blank mode, due to the fluctuating signals $S_{f1}$ and $S_{f2}$ no longer being carried with the RF signal, as FIG. 6 shows, the amplitude of amplified fluctuating signals $S_{a1}'$ and $S_{a2}'$ are P, results in the amplitude of the push-pull signal $S_2'$ equals to 2P, not still 2L. Please refer to FIG. 5 and FIG. 7. FIG. 7 is a diagram of amplified fluctuating signals $S_{a1}''$ and $S_{a2}''$ read by the wobble subtractor 260 shown in FIG. 4 when a blank mode is activated and the level decision unit 230 controls the first amplifier 220a and the second amplifier 220b, i.e. the skill used in the present invention. Because the level decision unit 230 controls the amplitudes of output signals amplified by the first amplifier 220a and the second amplifier 220b, the amplitude of amplified fluctuating signals $S_{a1}''$ and $S_{a2}''$ are adjusted from P to L, that is, the amplitude of the push-pull signal $S_2''$ remains 2L, not 2P. It guarantees that the push-pull signals keep the same resolution between mode switching.

The claimed invention provides a method and apparatus applied in an optical disc drive for obtaining a push-pull signal via adjusting amplifying gains of the amplifiers dynamically. Because the gain values are adjusted according to the an operating mode currently activated by the optical disc drive, a precise push-pull signal can be effectively obtained when the operating mode of the optical disc drive is switched from one mode to another mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus in an optical disc drive for obtaining a push-pull signal according to a first fluctuating signal and a second fluctuating signal, the first fluctuating signal being generated according to detecting signals generated from one side of a photo detector, the second fluctuating signal being generated according to detecting signals generated from the other side of the photo detector, the apparatus comprising:
    a first amplifier coupled to the first fluctuating signal for utilizing a first gain value to amplify the first fluctuating signal and then outputting a first amplified fluctuating signal;
    a second amplifier coupled to the second fluctuating signal for utilizing a second gain value to amplify the second fluctuating signal and then outputting a second amplified fluctuating signal;
    a subtractor electrically connected to the first and second amplifiers for subtracting the second amplified fluctuating signal from the first amplified fluctuating signal to generate the push-pull signal; and
    a level decision unit electrically connected to the first and second amplifiers for adjusting amplitudes of signals amplified by the first and second amplifiers;
    wherein when the optical disk drive is switched from a read or write mode to a blank mode, the level decision unit adjusts the amplitudes of the signals amplified by the first and second amplifiers to be lower.

2. The apparatus of claim 1 wherein the first and second amplifiers both are auto-gain-control (AGC) amplifiers.

3. The apparatus of claim 1 wherein the level decision unit sets both amplitudes outputted by the first and second amplifiers the same.

4. The apparatus of claim 1 wherein the push-pull signal is a wobble signal.

5. The apparatus of claim 1 wherein the optical disc drive is a DVD-R/RW drive.

6. The apparatus of claim 1, further comprising:
    a first multiplier electrically connected between the first amplifier and the subtractor for multiplying the first amplified fluctuating signal with a first coefficient;
    a second multiplier electrically connected between the second amplifier and the subtractor for multiplying the second amplified fluctuating signal with a second coefficient; and
    a balance decision unit electrically connected to the first and second multipliers for dynamically adjusting the first and second coefficients.

7. The apparatus of claim 6 wherein the balance decision unit sets both the first and second coefficients by the same value.

8. The apparatus of claim 6 wherein the push-pull signal is a land pre-pit signal.

9. A method applied in an optical disc drive for obtaining a push-pull signal according to a first fluctuating signal and a second fluctuating signal, the first fluctuating signal being generated according to detecting signals generated from one side of a photo detector, the second fluctuating signal being generated according to detecting signals generated from the other side of the photo detector, the method comprising:
    utilizing a first gain value to amplify the first fluctuating signal for generating a first amplified fluctuating signal;
    utilizing a second gain value to amplify the second fluctuating signal for generating a second amplified fluctuating signal;
    subtracting the second amplified fluctuating signal from the first amplified fluctuating signal to generate the push-pull signal; and
    adjusting amplitudes of the first and second amplified fluctuating signals, wherein when the optical disk drive is switched from a read or write mode to a blank mode, the amplitudes of the first and second amplified fluctuating signals are adjusted to be lower.

10. The method of claim 9 further comprising:
setting both amplitudes of first and second amplified fluctuating signals by the same value.

11. The method of claim 9 wherein the push-pull signal is applied as a wobble signal.

12. The method of claim 9, further comprising:
multiplying the first amplified fluctuating signal with a first coefficient;
multiplying the second amplified fluctuating signal with a second coefficient; and
adjusting the first and second coefficients dynamically.

13. The method of claim 12 further comprising:
setting both the first and second coefficients by the same value.

14. The method of claim 12 wherein the push-pull signal is applied as a land pre-pit signal.

* * * * *